US011222131B2

(12) United States Patent
Oberhofer et al.

(10) Patent No.: US 11,222,131 B2
(45) Date of Patent: Jan. 11, 2022

(54) METHOD FOR A SECURE STORAGE OF DATA RECORDS

(71) Applicant: International Business Machines Corporation, Armonk, NY (US)

(72) Inventors: Martin Oberhofer, Sindelfingen (DE); Soma Shekar Naganna, Bangalore (IN); Scott Schumacher, Porter Ranch, CA (US); Abhishek Seth, Saharanpur (IN); Geetha Sravanthi Pulipaty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 16/581,846

(22) Filed: Sep. 25, 2019

(65) Prior Publication Data

US 2020/0143076 A1    May 7, 2020

(30) Foreign Application Priority Data

Nov. 1, 2018  (IN) .............................. 201811041359

(51) Int. Cl.
G06F 21/62      (2013.01)
H04L 9/00       (2006.01)
H04L 9/06       (2006.01)
G06F 21/60      (2013.01)

(52) U.S. Cl.
CPC ........ *G06F 21/6227* (2013.01); *G06F 21/602* (2013.01); *H04L 9/006* (2013.01); *H04L 9/0643* (2013.01)

(58) Field of Classification Search
CPC ............... G06F 21/6227; G06F 21/602; G06F 21/6245; H04L 9/006; H04L 9/0643; H04L 9/0894; H04L 9/008; H04L 9/3239
See application file for complete search history.

(56) References Cited

U.S. PATENT DOCUMENTS

| 7,668,820 B2 | 2/2010 | Zuleba |
| 9,652,512 B2 | 5/2017 | Litherland et al. |
| 10,929,402 B1 * | 2/2021 | Meng ................... H04L 9/0816 |
| 2004/0210763 A1 * | 10/2004 | Jonas ................. H04L 63/0407 713/193 |

(Continued)

OTHER PUBLICATIONS

Oberhofer et al., "Method for a Secure Storage of Data Records", India Application No. 201811041359, Filed Nov. 1, 2018, 53 pages.

(Continued)

*Primary Examiner* — Meng Li
(74) *Attorney, Agent, or Firm* — Edward J. Wixted, III

(57) ABSTRACT

The present disclosure relates to a method for a secure storage, matching and linking of data records. The method comprises: receiving a current data record having one or more attributes, each attribute having an attribute value. For each attribute of at least part of the attributes a predefined set of variations of the attribute value of the attribute may be generated. The received attribute values may be encrypted resulting in an encrypted record and the generated sets of variations may be encrypted. The encrypted record may be stores in a storage system in association with the respective encrypted sets of variations.

19 Claims, 5 Drawing Sheets

(56) References Cited

U.S. PATENT DOCUMENTS

| | | | |
|---|---|---|---|
| 2004/0243816 A1* | 12/2004 | Hacigumus | G06F 16/24561 |
| | | | 713/193 |
| 2007/0214404 A1* | 9/2007 | Rehberg | G06F 40/56 |
| | | | 715/205 |
| 2009/0313463 A1 | 12/2009 | Pang et al. | |
| 2010/0071030 A1* | 3/2010 | Rosenan | G06F 21/73 |
| | | | 726/2 |
| 2014/0281589 A1* | 9/2014 | Bain | G06F 21/6218 |
| | | | 713/193 |
| 2015/0304287 A1 | 10/2015 | Rohloff | |
| 2015/0356314 A1 | 12/2015 | Kumar et al. | |
| 2015/0371059 A1* | 12/2015 | Bilogrevic | G06F 21/6245 |
| | | | 726/26 |
| 2016/0246828 A1 | 8/2016 | Cho et al. | |

OTHER PUBLICATIONS

Schmidlin et al., "Privacy Preserving Probabilistic Record Linkage (P3RL): a novel method for linking existing health-related data and maintaining participant confidentiality", BMC Medical Research Methodology, 2015, 10 pages, <bmcmedresmethodol.biomedcentral.com/articles/10.1186/s12874-015-0038-6>.

Tebaa et al., "Secure Cloud Computing through Homomorphic Encryption", International Journal of Advancements in Computing Technology (IJACT), vol. 5, No. 16, Dec. 2013, 10 pages, <https://arxiv.org>.

* cited by examiner

METHOD FOR A SECURE STORAGE OF DATA RECORDS

BACKGROUND

The present invention relates to the field of digital computer systems, and more specifically, to a method for a secure storage, of data records.

Encryption of data such as critical corporate data, overall sensitive data and personal data becomes inevitable, in particular in view of the EU General Data Protection Regulation (GDPR) laws. However, the existing data processing techniques such as duplicate removal techniques become more complex or may not even work with the information being encrypted.

SUMMARY

Various embodiments provide a method for a secure storage of data records, computer system, encryption method and computer program product as described by the subject matter of the independent claims. Advantageous embodiments are described in the dependent claims. Embodiments of the present invention can be freely combined with each other if they are not mutually exclusive.

In one aspect, the invention relates to a method for a secure storage of data records. The method comprises: receiving a current data record having one or more attributes, each attribute having an attribute value; for each attribute of at least part of the attributes generating a predefined set of variations of the attribute value of the attribute; encrypting the received attribute values resulting in an encrypted record and encrypting the generated sets of variations; storing in a storage system the encrypted record in association with the respective encrypted sets of variations.

In another aspect, the invention relates to a computer system for a secure storage of data records. The computer system is configured for: receiving a current data record having one or more attributes, each attribute having an attribute value; for each attribute of at least part of the attributes generating a predefined set of variations of the attribute value of the attribute; encrypting the received attribute values resulting in an encrypted record and encrypting the generated sets of variations; storing in a storage system the encrypted record in association with the respective encrypted sets of variations.

In another aspect, the invention relates to a randomized encryption method comprising encrypting character by character a first value such that the difference between two ciphertexts, generated from two same characters, is a random term that is different from zero, wherein the application of a predefined operation on the random term results in a value indicating that the ciphertexts were generated from the same characters.

In another aspect, the invention relates to a computer program product comprising a computer-readable storage medium having computer-readable program code embodied therewith, the computer-readable program code configured to implement all of steps of the method according to preceding embodiments.

BRIEF DESCRIPTION OF THE DRAWINGS

In the following embodiments of the invention are explained in greater detail, by way of example only, making reference to the drawings in which.

DETAILED DESCRIPTION

Figure 1:
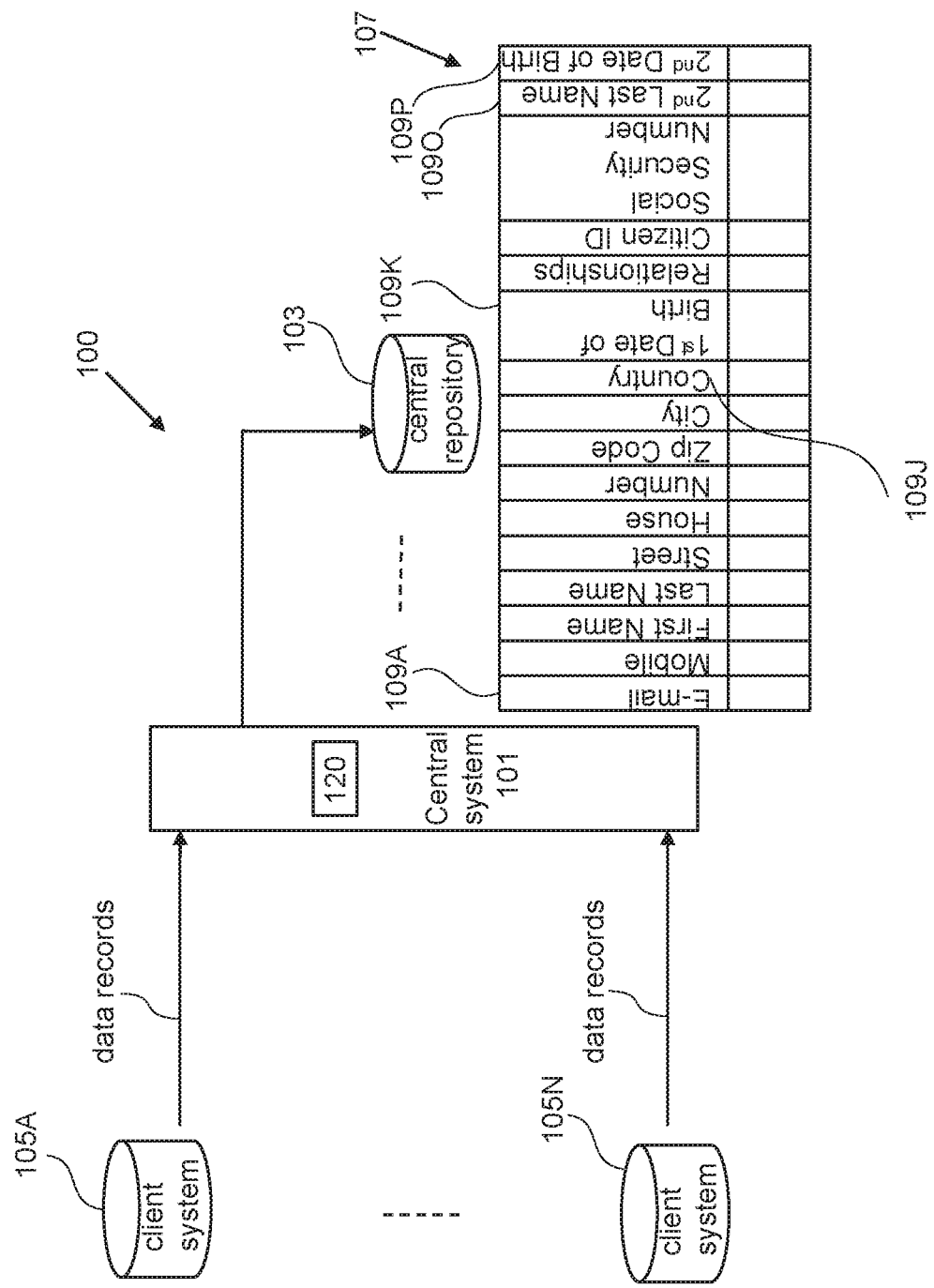
FIG. 1 depicts a block diagram representation of an exemplary master data management system.

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present disclosure may have the advantage of securing the access and the processing of data and thus adhering to existing data privacy rules and laws. The present method may further have the advantage of enabling an efficient search of encrypted data records. For example, the additional sets of variations may provide additional information on the stored encrypted records which may expand the search possibilities and thus may increase the number of results returned. The present method may enable a secure matching and linking along with secure storage of encrypted data records.

The storage system may be a central repository that stores data received from multiple client systems in accordance with the present disclosure. The central repository may be a data store, storage, or database. This may provide a central storage of data for multiple client systems. The method may, for example, be repeated for further received records resulting in the storage system comprising encrypted records in association with encrypted sets of variations. The set of variations of a given attribute value may or may not comprise the given attribute value.

A data record, or record, is a collection of related data items such as a name, date of birth, and class of a particular user. A record represents an entity, wherein an entity refers to a user, object, or concept about which information is stored in the record. The terms "data record" and "record" are interchangeably used.

A variation (or equivalent) of an attribute value may be another attribute value that results from changing the attribute value using a predefined variation method. The result of changing the attribute value is another value that reflects the same content as the changed attribute value. The predefined variation method is configured to obtain an equivalent of an attribute value. The equivalent may be a phonetic, name or address equivalent, or a sorted value etc. For example, name "Robeert" may be a spelling error of the name "Robert", thus the variation may be performed on the name "Robeert"

to obtain the name "Robert" for undoing the spelling error or vice versa changing the name "Robert" to obtain "Robeert". In another example, a name "Max" may be written differently depending on the countries, and the variation may implement such as difference when generating the variation from one attribute value.

According to one embodiment, the method further comprises repeating the method for further received data records, wherein in each current repetition, the storing of the currently encrypted record is executed depending on the respective encrypted sets of variations of the further received data record. For example, based on the encrypted sets of variations, the further records may or may not be stored (e.g. "not stored" means that they may be merged with other records before the resulting merged record is stored). This may prevent storing duplicate records. This embodiment may enable to match and link encrypted data in a secure fashion adhering to all data privacy rules and laws. The matching and linking of the data records is performed using only the encrypted information of the data records and a predefined record matching and linkage technique.

In another example, the method further comprises repeating the method for further received data records, resulting in stored encrypted records in association with respective encrypted sets of variations. The deduplication may be performed on the stored encrypted records by comparing the stored encrypted sets of the variations as described herein with the record matching and linkage technique.

The present method may, for example, be deployed and used for Big Data solutions (e.g. IBM® BigMatch technology running on IBM® BigInsight®, Cloudera® and Hortonworks®) and with information integration software (e.g. Informatica® PowerCenter®, IBM® Information Server).

According to one embodiment, the method further comprises: identifying previous candidate encrypted records stored in the storage system. Each identified previous candidate encrypted record has at least one encrypted set of variations matching the encrypted sets of variations of the currently encrypted record. The method further comprises comparing the current encrypted record with the previous candidate encrypted records; wherein the storing is executed depending the comparison result. For example, in case the currently encrypted record is different from the candidate encrypted records, the storing of the encrypted record may be performed. However, in case the current encrypted record matches at least one candidate encrypted record, the current encrypted record may be merged with the at least one candidate encrypted record before storing the resulting merged record.

The identification of the candidate encrypted records may be part of a linkage component of the record matching and linkage technique. The comparison between the current record and each of the candidate records in encrypted format may be performed by a matching component of the record matching and linkage technique. The matching component may, for example, use an encrypted comparison for comparing encrypted data. The encrypted comparison enables to compare encrypted attribute values without having to decrypt the compared encrypted attribute values. If, for example, value "Robert" is encrypted as "abcdef" for one record and for another record it is encrypted as "opqxyz", the encrypted comparison enables one to compare "abcdef" and "opqxyz" and indicate, as a result of the comparison, that they are encrypted values of the same plaintext value without knowing the plaintext value. The encrypted comparison may also indicate that two encrypted values (e.g. "Robert" and "Max") are encrypted values of different plaintext values without knowing the plaintext values.

When data comes from multiple data sources, matching and linking of different records enables the creation of entities. This embodiment may use the record matching and linkage technique for deciding to store or not store the further encrypted record (storing or not storing the further encrypted record as it is received). This embodiment may seamlessly be integrated in existing record linkage algorithms. For example, an existing record linkage algorithm may be configured to perform the function of the record matching and linkage technique using the encrypted sets of variations. Each set of variation may further include the respective attribute value from which the set of variations is generated and the resulting set is encrypted leading to the encrypted set of variations.

According to one embodiment, the method further comprises defining multiple groups; associating each defined group with a respective bucket of one or more attributes resulting in multiple bucket attributes; determining bucket attributes of the multiple buckets that are part of the current record; assigning the current encrypted record to one or more of the defined groups using the encrypted sets of variations of the current encrypted record, wherein the assigning to a group of the one or more groups comprises computing a hash of at least the encrypted value of the respective bucket attributes (after the encryption of the attribute values is performed) using a hash function and storing the hash in association with the current record. The record may, for example, be stored against the hash as a key-value pair. For example, for each bucket attributes of the multiple buckets attributes, a hash may be computed from the encrypted attribute values of the bucket attributes and the respective encrypted sets of variations.

For example, initial attributes att1, att2, att3 and att4 may be provided such that each received record may have part or all of these attributes. Those attributes may, for example, be defined using history data of other systems. The initial attributes may be referred to as critical attributes that may be useful for performing data searches. Three groups may, for example, be defined, wherein two groups (group1 and group3) are associated with respective single attributes (att1 and att4) and one group (group2) is associated with two attributes (att2 and att3). This results in three bucket attributes. One bucket attributes (buck1) comprises att2 and att3, another bucket attributes (buck2) comprises att1 and a further bucket attributes (buck3) comprises att4. The current record may, for example, comprise attributes att1, att2, att3, att6 and att7. Only attributes att1, att2 and att3 may be the critical attributes as defined above with the initial attributes, e.g., att6 and att7 may not be distinctive enough to perform focused search of records and thus are not defined as critical attributes of the initial attributes. In this case, the current record has two bucket attributes buck1 and buck2. The current record may thus be assigned to groups group1 and group2. The sets of variations set1, set2 and set3 of respective values of att1, att2 and att3 of the current record may be used after being encrypted to compute two hashes of the two buckets that belong to the current record. A hash may be calculated using encrypted set1 and att1 and another hash may be calculated using a combination of encrypted set2 and set3 and att2 and att3. This embodiment may provide an efficient indexing of the data records. Such indexing may improve the performance of linking and matching algorithms. The grouping or bucketing involves the creation of indexes in the form of hashes of specific attributes to make the data search faster.

According to one embodiment, the method further comprises repeating the method for further received data records. In each repetition previous candidate encrypted records having at least one hash which matches the computed one or more hashes of the current encrypted record may be identified. The current encrypted record may be compared with the candidate encrypted records; wherein the storing is performed based on the comparison result. For example, whenever a new record is received, there is the linkage and matching which kicks off. The linkage component may search for the existing records which might be possible duplicates. Once the candidates are selected, the matching component may perform the encrypted comparison to compare all probable candidate records with the incoming record in encrypted format. The comparison may, for example, be performed using a given threshold value such that a score of the comparison result may be compared with the given threshold value for determining if they match or not.

According to one embodiment, the one or more attributes may be referred to as a set of one or more attributes. The encrypting of the attributes comprises encrypting character by character attribute values of at least a subset of attributes of the set of attributes using a first encryption method, wherein the difference between two ciphertexts, generated from two same values by the first encryption method, is a random term that is different from zero, wherein the application of a predefined operation on the random term results in a value indicating that the ciphertexts were generated from the same values.

This embodiment enables to control the difference between two ciphertexts. The first encryption method is provided such that the difference has a random source but it can still be indicative of the result of comparison by applying a predefined operation on the random term. An example encryption method is described herein.

Following the above example, the set of attributes of the received record may be att1, att2, att3, att6 and att7. The subset of attributes may comprise att3, att6 and att7. The remaining subset (e.g. att1 and att2) of attributes may be encrypted with the first encryption method or with another supplementary encryption method. This embodiment may enable encrypted comparison on character level.

According to one embodiment, the subset of attributes are attributes that are comparable by an edit distance comparison. In one example, the subset of attributes may comprise all attributes of the set of attributes.

The subset of attributes (e.g. att6, att7 and att3) may comprise attributes like name, zip, phone, etc. which require edit distance to be computed for comparing two values of these kind of attributes. However, edit distance algorithms may not directly work for encrypted values (i.e., edit distance algorithms may not enable the encrypted comparison). The present method enables to compute the edit distance between two strings in their encrypted format obtained by the first encryption method. For that, the attributes may be provided as a stream of encrypted letters of the actual string. This way, the edit distance between two encrypted strings becomes the edit distance between the two streams of encrypted characters. In the edit distance algorithm, all the characters of two strings are compared. The edit distance method is executed for two arrays of encrypted characters of two compared strings.

According to one embodiment, the method further comprises: providing a known randomized encryption formula (or known randomized encryption method) having a source of randomness and a public key; fixing the source randomness resulting in a constant source; and adding a term $f(R, n)$ to the encryption formula resulting in the first encryption method, where R is a random integer number and n is a number used to generate the public key. The known randomized encryption method may, for example, be a homomorphic encryption method.

For example, the known encryption formula is $e(r,n)$ and $f(R,n)$ is a function of R and n. The new encryption formula is $E(r,n)+f(R,n)$. The difference between two ciphertexts c1 and c2 generated by the present method from plaintext values v1 and v2 may be as follows: $Diff1=[f(R1,n)-f(R2,n)]+[e1(r,n)-e2(r,n)]$ if v1 is different from v2 and $Diff2=[f(R1,n)-f(R2,n)]$ if v1 is the same as v2. This is because $E(r,n)$ has a fixed source of randomness r which would cancel out when performing the difference for ciphertexts generated from same values v1 and v2. Thus, $f(R,n)$ may be provided such that by applying an operation OP on Diff1 and Diff2, the two results would be different and in addition the result of the operation OP on Diff2 would always be the same for each compared ciphertexts. $OP(Diff1) \neq OP(Diff2)$ and $OP(Diff2)$ would always be the same for each compared ciphertexts.

For example, the public key for the Paillier cryptosystem may comprise numbers n and g. The function $f(R,n)$ may be provided such that the difference Diff2 is an integer multiple of the predefined number n2. This may enable to always find 0 as a result of applying a modulo operation between the difference Diff2 and that predefined number n2. Thus, if the result of the modulo operation on the difference is 0, the two ciphertexts are generated from same plaintext values; otherwise they are generated from different values.

According to one embodiment, the first encryption method comprises creating a ciphertext c for each character s of the attribute value as follows: $c=gs \cdot rn \bmod n2 + R \cdot n2$, where $0<r<n$ is a constant random number, (n, g) is a public key for encryption and R is a random integer number that varies in each encryption, wherein the operation is a modulo operation indicating that the difference under modulus n2 equals to 0 for ciphertexts generated of same values. This embodiment may enable to configure encryption formula of the Paillier cryptosystem such that edit distance comparisons may be performed directly on encrypted data. For example, this embodiment may provide a variant of the Paillier cryptosystem for encrypting the data. The Paillier cryptosystem is a randomized encryption and semantically secure. However, comparing two ciphertexts in a semantically secure cryptosystem may not be possible. In this embodiment, a random number r that is used while encryption along with the public key may be generated at the initiation step and using the same value for all the executions of this encryption. This allows to check for the equality of the two encrypted strings which is one of the key operations needed for calculating the edit distance. For a message $0<=m<=n$, compute ciphertext as: $c=gm \cdot rn \bmod n2$ where $0<r<n$ is the random number and (n,g) is the public key for encryption.

According to one embodiment, the sets of variations are encrypted using a second encryption method; wherein the attributes of the current encrypted record are further encrypted with a third encryption method. This may enable a hybrid encryption approach. Following the above example, the subset of attributes att3, att6, and att7 have been encrypted by the first encryption method and the remaining subset of attributes att1 and att2 have been encrypted by the supplementary encryption method. With this embodiment, the attributes of both subsets att1, att2, att3, att6, and att7 may further be encrypted with the third encryption method if the third encryption method is different from the supplementary encryption method. However, if the third encryption method is the supplementary encryption method only the subset of records att3, att6 and att7 may further be encrypted with the third encryption method.

As described above, there is a need for encrypting all the characters of the strings for which edit distance needs to be calculated. To further improve the secure aspect of the present method, a hybrid approach may be applied where the whole incoming data (i.e. the attributes of the current encrypted record) is encrypted by one encryption scheme and the extra metadata formed by the sets of variations can be encrypted by some other scheme. By using this hybrid approach, the system can achieve more security while still performing the operations involved in matching and linking of encrypted data.

According to one embodiment, the set of variations of an attribute value resulting in a set of equivalents or potential duplicates of the attribute value. The equivalents of an attribute values may be potential duplicates of the attribute value. The set of variations of the attribute value further comprises the attribute value.

According to one embodiment, the set of variations comprising any one of: spelling variations; phonetic variations; metaphonic variations and number sorting. The number sorting may, for example, be performed using a user defined sorting. The user defined sorting may, for example, be configured to rearrange digits of a given number for a predefined number of times e.g. resulting in an ascending order or descending order of the numbers. For example, the sorting of a number comprises sorting the number either in ascending order or descending order. For example, the number sorting of attribute value 001567 may result in numbers 560071, 560710 and 650017. Thus the set of variations may comprise 001567, 560071, 560710 and 650017. For example, for attribute value "Benjamin", the set of variations may comprise: "Jamie" and "Benn" and "Benjamin" indicating a set of equivalent names and a set of variations for attribute value "Jamie" may comprise "Benjamin" and "Benn", "Jamie". For performing phonetic variations and metaphonic variations predefined phonetic and metaphonic equivalent tables may be used. These tables may comprise equivalents of different attribute values. For example, Soundex, Metaphone1 and Metaphone2 are example functions for determining the phonetic variations.

In an example, phonetic or metaphonic equivalents may be determined as follows. Since the data stored is encrypted, phonetic or metaphonic functions may not work directly on it. For that, when, for example, a record having an attribute of type "name" is received, the phonetically equivalent one or more values for that attribute may be generated (the one or more values form the set of variations), encrypted and then stored against or in association with the actual encrypted attribute value of the attribute of the received record. The data which is considered to be equivalent, e.g., Bill & William, Robert & Bob, or St. & Street is encrypted and stored e.g. in a configuration file. The names or values which are considered as anonymous values may be encrypted and stored in the configuration file.

In another example, the set of variations of a given attribute value may comprise all the possible acronyms and, for a given attribute value being a number, the given value may be sorted (resulting in one or more variations) and the encrypted sorted value may be stored against the encrypted actual value of the given attribute. The sorting may, for example, be performed after the standardization is performed on the given attribute value. In another example, an anonymous removal may be performed. For example, the present method may provide a predefined list of attributes values (e.g. of attributes 109A-P) such as for names, numbers, addresses, etc., which are junk or invalid values. In one example, the predefined list contains encrypted form of those invalid values. After encryption of the attribute values of the received record and/or respective sets of variations, a check is performed to determine if an encrypted attribute value, of the encrypted values, is present in the predefined list and, if so, the corresponding attribute value is replaced by an empty string.

According to one embodiment, the method further comprises upon receiving the current data record, and before generating the variations, performing a standardization of the attributes by transforming each attribute value of the attributes to a respective predefined format.

The standardization refers to a process of transforming data to a predefined data format. The data format may include a common data definition, format, representation, and structure. The data that is to be transformed is the data that does not conform to the predefined data format. For example, the process of transforming the data may comprise processing the data to automatically transform the data where necessary to comply with those common representations that define the data format. This process of transforming data may include identifying and correcting invalid values, standardizing spelling formats and abbreviations, and validating the format and content of the data. For example, the predefined data format may be a date format for writing dates, e.g., DD.MM.YY. If the received date attribute value does not fulfill the date format a standardization may be executed on the received data attribute value in order to rewrite the received data attribute in the date format. This may enable a consistent and homogenous processing among received records, particularly if they are received from different data sources. This may enable accurate results of the present method.

According to one embodiment, the method further comprises upon receiving the current data record compressing the attributes. To reduce the storage requirements, compression can be applied at different places of the process, e.g., before generating the variations. For example, the compression may be performed after standardization. This may be advantageous because some compression techniques may scramble the data that certain operations like phonetic analysis are not possible anymore. The standardization reduces the number of distinct values. That means it may be sufficient to compress the unique distinct standardized values contributing to further storage requirement reduction.

According to one embodiment, the at least part of the attributes comprises all attributes of the record. This may further increase the returned search results of searches performed on the storage system.

FIG. 1 depicts an exemplary computer system 100. The computer system 100 may, for example, be configured to perform master data management and/or data warehousing. The computer system 100 comprises a data integration system 101 and one or more client systems or data sources 105A-N (collectively referred to as 105). The client system 105 may comprise a computer system (e.g. as described with reference to FIG. 6). The data integration system 101 may control access (read and write accesses etc.) to a central repository 103. The storage system may comprise the central repository 103.

Data integration system 101 may process records received from client systems 105 and store the data records into central repository 103. The client systems 105 may communicate with the data integration system 101 via a network connection which comprises, for example, a wireless local area network (WLAN) connection, WAN (Wide Area Network) connection LAN (Local Area Network) connection or a combination thereof.

The data records stored in the central repository 103 may have a predefined data structure 107 such as a data table with multiple columns and rows. The predefined data structure may comprise a set of attributes 109A-P (e.g. each attribute representing a column of the data table 107). In another example, the data records may be stored in a graph database as entities with relationships. The predefined data structure may comprise a graph structure where each record may be assigned to a node of the graph. Although the present example is described in terms of few attributes, more or less attributes may be used. The set of attributes 109A-P may, for example, be dynamically updated or determined while receiving data records e.g. if a received data record has a new attribute that is not part of set of attributes 109A-P, that new attribute may be added to the set of attributes 109A-P. In another example, the set of attributes 109A-P may be determined based on historical data indicating all attributes that are used by client systems 105.

For example, the client systems 105 may be configured to provide or create data records which may or may not have the same data structure 107. The attributes of each record received from the client systems 105 may be part of or all the attributes 109A-P. For example, a client system 105 may be configured to provide records in XML or JSON format or other formats that enable the association of attributes and corresponding attribute values, wherein at least part of the attributes 109A-P are associated in the XML with respective values.

Each client system 105 may be configured to send the created data records to the data integration system 101 in order to be stored on the central repository 103 and processed, in accordance with an example method of the present disclosure. Before being processed, the received record may be transformed, e.g., by the data integration system 101, into a format of the data structure 107.

In one example, data integration system 101 may import data records from a client system 105 via HyperText Transport Protocol ("HTTP") communication or other types of data exchange. The data integration system 101 and/or client systems 105 may be associated with, for example, Personal Computers (PC), servers, and/or mobile devices.

Each data record received from client systems 105 by the data integration system 101 may or may not have all values of the set of attributes 109A-P, e.g., a data record may have values of a subset of attributes of the set of attributes and may not have values for the remaining attributes. Once stored in the repository 103, the remaining attributes having no values may be maintained empty in one example. In other terms, the records provided by the client systems 105 have different completeness. The completeness is the ratio of number of attributes of a data record comprising data values to a total number of attributes in the set of attributes 109A-P.

The data integration system 101 may be configured to process the received records using multiple algorithms such as an algorithm 120 implementing the record matching and linkage technique. For example, the data integration system 101 may process the data records received from the client systems 105 using the algorithm 120 in order to find pairs of records that represent the same entity or identify duplicate records in accordance with the present disclosure.

Figure 2:
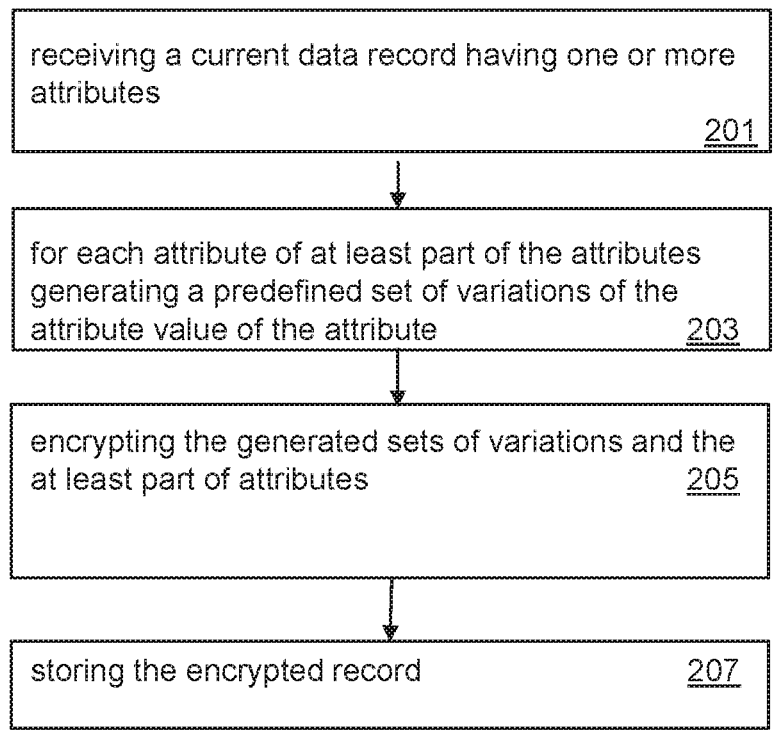
FIG. 2 is a flowchart of a method for a secure storage of data records.

FIG. 2 is a flowchart of a method for a secure storage of data records, e.g., in the central repository 103.

In step 201, a data record may be received, e.g., at the data integration system 101. The data record has a set of one or more attributes. The attributes may be of same or different data types such as string attributes, integer attributes, etc. The set of attributes may, for example, be at least part of the attributes 109A-P.

The received data record may, in one example, be pre-processed before being used in steps following step 201. The pre-processing may, for example, comprise the standardization of the data record. The standardization of the data record may, for example, comprise transforming the data record into a predefined format. For example, if the received data record is received in an XML or JASON format, the data record may be transformed to a structure as the data structure 107 described with reference to FIG. 1. This may enable a consistent processing of received records at the data integration system 101.

For each attribute of at least part of the attributes, a predefined set of variations of the attribute value of the attribute may be generated in step 203. For example, the method may comprise selecting the at least part of the attributes from the set of attributes using a predefined selection criterion. The predefined selection criterion may, for example, be user defined. The selection criterion may indicate attributes that can be more useful compared to other attributes for performing data searches. For example, the selection criterion may indicate the attributes "Zip code" 109h and "Citizen ID" 109m as being critical attributes that can be used for the data search and the at least part of the records may comprise "Zip code" 109h and "Citizen ID" 109m. The at least part of the attributes may be referred to as critical attributes. Using only the critical attributes may save processing resources while still providing enough information for performing the data searches.

The set of variations of a given attribute of the at least part of the attributes may be values that are obtained by varying the value of the given attribute, wherein the variation of the value of the given attribute is obtained by, for example, performing spelling variations, phonetic variations, metaphonic variations or number sorting of that value. The type of variations to be used for a given attribute may depend on the data type of the attribute. For example, for an integer type attribute the number sorting may be used. For example, the set of variations of attribute value "Robert" may comprise "Borert" and "Robbie".

The set of variations of a given attribute value may be potential duplicates or equivalents of the given attribute value. For example, the set of variations may cover spelling errors, such that the set of variations may comprise the given attribute value having spelling errors and/or may have a respective order of constituent parts of the given attribute which is different. For example, the given attribute value may be "Abhishek Seth" while a variation may be "Seth Abhishek".

The set of variations may be created for each critical attribute value of the received record. For example, if the critical attributes are two attributes, two sets of variations may be generated in step 203. Each of the created sets of variations may further comprise the respective critical attribute value.

In step 205, the generated sets of variations and the attribute values of the attributes may be encrypted. This results in an encrypted record that comprises encrypted values of the attributes of the received record and respective encrypted sets of variations. The encrypted set of variations of a given attribute may further comprise the encrypted value of the given attribute.

The encryption of the attribute values may be performed such that the encrypted comparison of the encrypted attribute values can be performed without having to decrypt the compared encrypted attribute values. If, for example, value "Robert" is encrypted in one record as "abcdef" and in another record it is encrypted as "opqxyz", the encrypted comparison enables to compare "abcdef" and "opqxyz" and indicate as a result of the comparison that they are encrypted values of the same plaintext value without knowing that plaintext value. The encrypted comparison will also indicate that two encrypted values (e.g. of "Robert" and "Max") are encrypted values of different plaintext values without knowing that plaintext values.

In one example, the encryption of the critical attributes may be performed using an encryption method as described with reference to FIG. 5. The other or remaining attributes (different from the at least one attribute) of the received record may be encrypted by that encryption method or by another encryption method.

In step 207, the encrypted record may be stored in association with the respective encrypted sets of variations or encrypted metadata e.g. in the central repository 103. The encrypted record may be stored against the sets of variations (e.g. against hashes generated of the sets of variations) as a key-value pair.

For example, each of the sets of variations of the at least part of the attributes may be provided as metadata descriptive of the received data record. And the encrypted sets of variations may be provided as encrypted metadata. The method of FIG. 2 enables to securely store data records while enabling an efficient data search by associating them with the created encrypted metadata. In other terms, the more information is provided in addition to the data record itself the better the data search is. That encrypted metadata may, for example, be used as described with reference to FIGS. 3 and 4.

Figure 3:
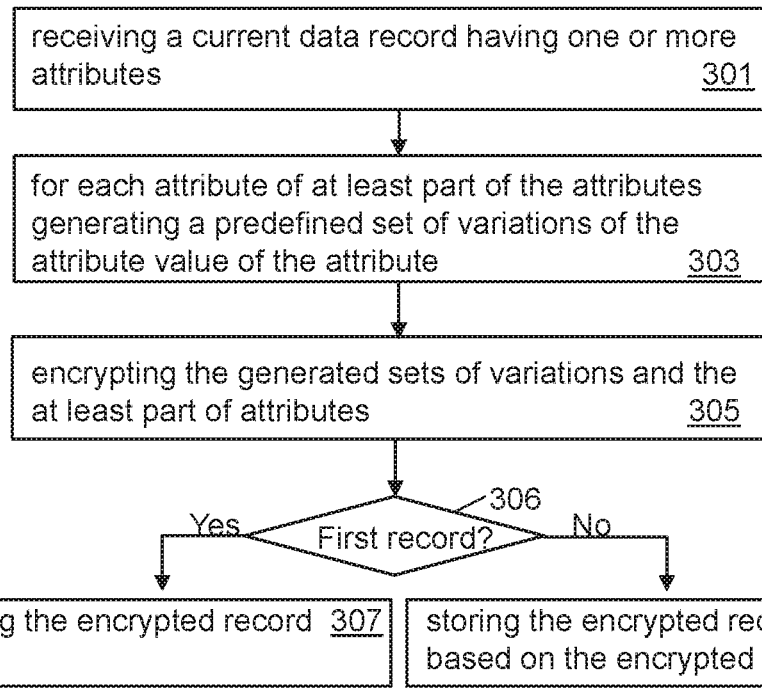
FIG. 3 is a flowchart of a method for a secure and non-duplicated storage of data records.

FIG. 3 is a flowchart of a method for a secure and non-duplicated storage of data records.

Steps 301, 303, 305 and 307 correspond to steps 201, 203, 205 and 207 of FIG. 2, respectively. The method of FIG. 3 may, for example, be applied for a stream of received data records as follows.

For the first received record (e.g., received before the central repository 103 is filled with records), the method of FIG. 2 may be performed as described above.

For a further received record, e.g., received at the data integration system 101, steps 301-305 may be performed. The further received record may or may not have the same structures as previously received records. In case (inquiry step 306) of the further record, the storage of the encrypted further record may be conditional to its associated encrypted sets of variations e.g., depending on its encrypted metadata it may or may not be stored.

For example, in step 303 the critical attributes determined for the further record may or may not be the same as the critical attributes of the previous received records, e.g., depending on the result of applying the selection criterion, the critical attributes of the further record may or may not be the same as the critical attributes of the previous records. For example, the further record may only have "Citizen ID" and not the "Zip code". In this case a single set of variations may be generated for the attribute "Citizen ID".

The one or more encrypted sets of variations of the further record may then be compared with existing or previous sets of variations that are stored in the central repository 103. The comparison of the encrypted sets of variations may be an encrypted comparison. If there is one or more previous sets of variations that match (e.g., hashes generated from those matching sets of variations are equal) the one or more set of variations of the further record; the associated encrypted data records may be identified as candidate duplicate records. For example, if the encrypted set of variation of the value of "Citizen ID" of the further record is matching three encrypted sets of variations that are stored in the central repository 103, the encrypted data records that are associated with these three encrypted sets may be candidate duplicate records. The candidate duplicate records may then each be compared using the encrypted comparison with the further record (e.g. using the method of FIG. 4) and based on the comparison result, the further record may or may not be stored in the central repository 103. For example, in case the encrypted further record is different from each of the candidate duplicate records, the encrypted further record may be stored in association with its one or more sets of the variations. This may enable to store non-duplicate records. However, if the encrypted further record matches at least one candidate encrypted record of the encrypted record, the encrypted further record may be merged with that one candidate record.

Figure 4:
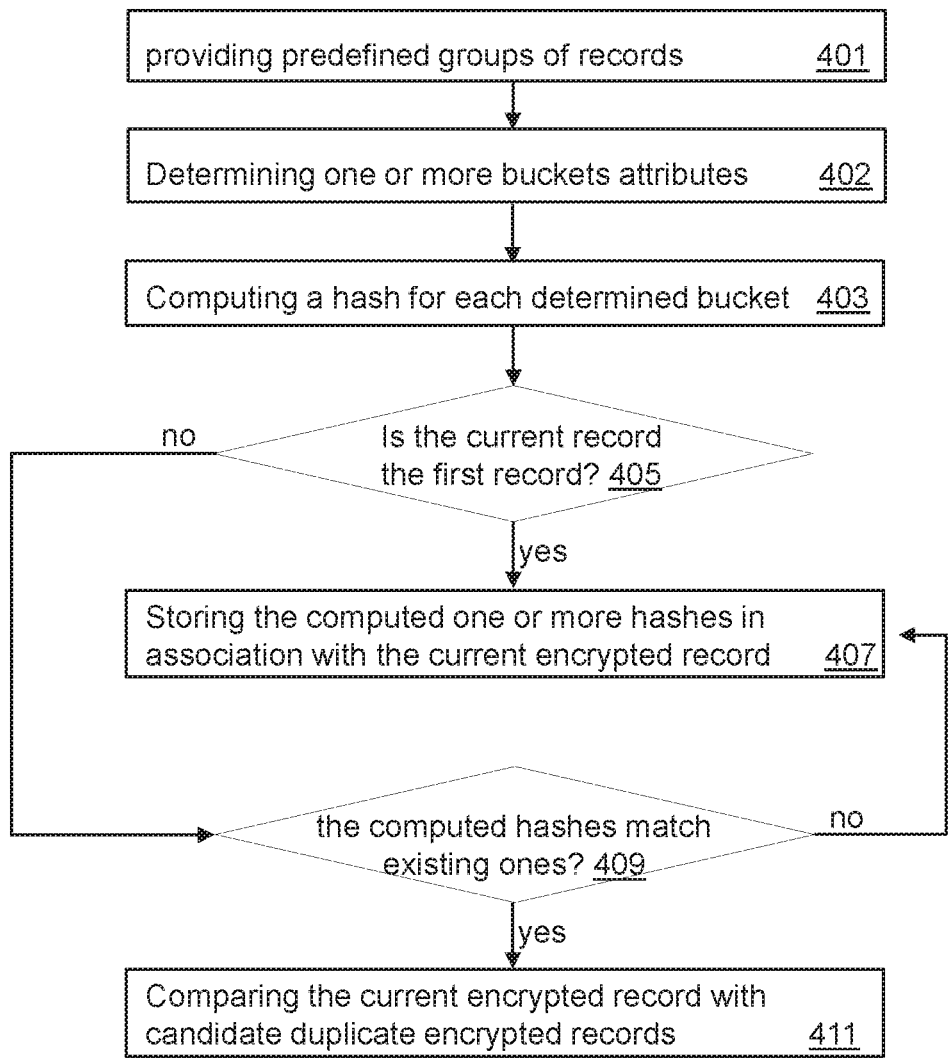
FIG. 4 is a flowchart of a method for matching encrypted records in accordance with the present disclosure.

FIG. 4 is a flowchart of a method for linking and matching encrypted records in accordance with the present disclosure.

In step 401, multiple groups may be defined, wherein each defined group is associated with a respective bucket of one or more attributes of a given set of attributes resulting in multiple bucket attributes. The given set of attributes may, for example, comprise critical attributes of the attributes 109A-P.

For example, the set of attributes may be as follows: FirstName, LastName, SSN, Zip, Phone. The defined groups or buckets may be following three buckets: Bucket1 is associated with bucket attributes FirstName and Zip; Bucket2 is associated with bucket attributes LastName and Phone; and Bucket3 is associated with attribute SSN.

In step 402, one or more buckets attributes of the multiple buckets that are part of a current record may be determined.

Following the above example, the current record (rec1) has attributes and associated values as follows: LastName: Set, SSN: 123456, Zip: 560071, Phone: 1234567890. In this case, the determined bucket attributes may be Bucket1 and Bucket3, because the current record rec1 has attributes of those buckets only.

In step 403, a hash may be calculated for the determined one or more bucket attributes of step 401 using a hash function such as SHA256 and the sets of variations of each attribute of the bucket attributes. The sets of variations may be determined as described herein.

Following the above example, the set of variations (set3) of the SSN 123456 may be determined. The set of variations (set1_1) of last name Set may be determined, and the set of variations (set1_2) of the Phone 1234567890 may be determined. Then, a hash (hash1_rec1) may be calculated for the set of variations set3 of the bucket attribute SSN and another hash (hash2_rec1) may be calculated for the two sets of variations set1_1 and set_2 of the bucket attributes Phone and Last Name. The hash hash1_rec1 may be computed by concatenating (or appending) encrypted values of the set of variations set3 and the SSN 123456 and the hash function may be applied on the result of the concatenation to calculate the hash hash1_rec1. The other hash hash2_rec1 may, for example, be calculated by concatenating encrypted values of both sets set1_1 and set1_2 and name Set and 1234567890 before calculating the hash hash1_rec2 from the concatenated content using the hash function.

In case (inquiry step 405) the current record is the first record to be stored, the computed one or more hashes may be stored in step 407 in association with the current encrypted record and the respective one or more encrypted set of variations. Following the above example, the current record rec1 may be stored in association with hashes hash1_rec1 and hash2_rec1. This may be an indication that the record rec1 is assigned to buckets Bucket1 and Bucket3. This may enable to index or cluster the data records based on the similarity in the data attributes defined for buckets.

In case it is determined in inquiry step 405 that the current record (e.g. rec1) is not the first record to be stored e.g. because a record rec0 is already stored in the central repository 103 using the method described herein. For example, when receiving the record rec1 the central repository comprises record rec0 having the following attributes values in an encrypted format: FirstName: Abhishek, LastName: Seth, SSN: 123455, Zip: 560071, Phone: 1234567890 in association with three hashes hash1_rec0, hash2_rec0 and hash3_rec0 which are determined (as described with record rec1) using the sets of variations of the attribute values of the record rec0. The existence of three hashes of record rec0 indicates that record rec0 is assigned to buckets Bucket1, Bucket2 and Bucket3 since only three buckets are defined for this example.

Therefore, since the storage already comprises record rec0, before storing the current record rec1 it may be checked if it is not a duplicate of record rec0. For that, the hashes hash1_rec1 and hash2_rec1 of the record rec1 may each be compared with the stored hashes hash1_rec0, hash2_rec0 and hash3_rec0. If (inquiry step 409) there is at least one hash of hash1_rec0, hash2_rec0 and hash3_rec0 that matches one of the hashes hash1_rec1 and hash2_rec1, this may be an indication that record rec0 is a candidate duplicate record for the current record rec1 and thus a comparison between encrypted records rec1 and rec0 may be performed in step 411. Following the present example, the values Set and Seth may differ just because of a spelling error, and thus the sets of variations that were generated for Set and Seth may be the same set and thus the respective hashes may be the same. The present method thus provides a way to index or cluster the data records based on the similarity in the data attributes defined for buckets.

If however, there is no match between hash1_rec0, hash2_rec0, hash3_rec0, hash1_rec1, and hash2_rec1 (all hashes are different), then step 407 may be executed by storing the record rec1 in the central repository.

In step 411, an encrypted comparison may be performed between the received record rec1 and the candidate duplicate record rec0. If the compared records do not match each other the received record rec1 may be stored in the central repository 103; otherwise a merging of the records rec1 and rec0 may be performed.

The comparison of two encrypted records in step 411 may, for example, be performed using different comparison functions that each enable the encrypted comparison. Each comparison function may be assigned a weight, and the results of the comparison may be combined wherein the combination (e.g. sum) may be weighted by that weight. If the weighted combination is higher than a predefined threshold, the compared records are duplicate records otherwise they are not duplicate records. The comparison functions may, for example, involve phonetic equivalence comparison, metaphone equivalence comparison, name and address equivalence comparison, edit distance comparison, anonymous checking, acronym comparison and As-is comparison.

The merging of the two records comprises storing the attribute values of the two records such that they represent or are indicative of a single entity. This may, for example, be performed by providing linking information linking the attribute values of the two records for indicating the content that relates to a single entity.

Figure 5:
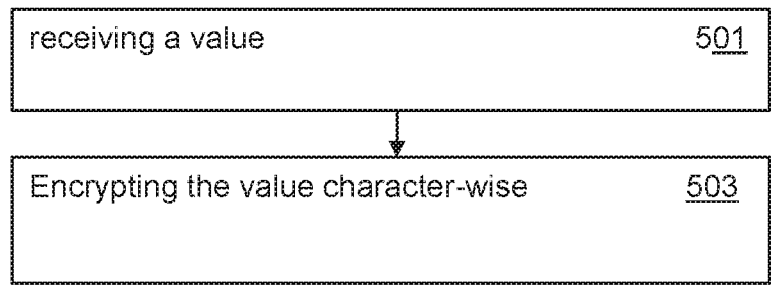
FIG. 5 is a flowchart of a method for encrypting a data value in accordance with the present disclosure.

FIG. 5 is a flowchart of a method for encrypting a data value in accordance with the present disclosure.

In step 501, a given value may be received. The given value may be a value of an attribute of a data record or may be another data value having a predefined data type. The data type may, for example, be a string type, integer type, float type, etc. For any data type, the given value may be treated as a set of K characters that form the given value. For example, if the value is "1986", "1" would be a character, "9" would be another character, "8" would be another character and "6" would be another character.

Each of the K characters of the given value may be encrypted in step 503 using a randomized encryption method, such that the difference between two ciphertexts, generated from two same characters, is a random term that is different from zero, wherein the application of a predefined operation on the random term results in a value indicating that the ciphertexts were generated from the same characters.

The randomized encryption method may, for example, be obtained as follows. Starting from a known randomized encryption formula such as formula of the Paillier cryptosystem gm·rn mod n2, where m is the message, (g,n) is the public key and 0<r<n is a random number that changes for each encryption rendering number r a source of randomness of the encryption formula. In accordance with the present method, this source of randomness may be fixed in order to obtain a constant source e.g. r is fixed for all the executions of the encryption. And in order to introduce randomness, a term f(R, n) as function of R and n may be added to the gm·rn mod n2, where R is a random integer number that varies between executions of the encryption. Since R changes for all the executions, for a given plaintext message m, values of ciphertext will be different for repeated executions and thereby bringing randomness. For example, f(R, n)=R·n2. The resulting encryption formula of the present encryption method may then be gm·rn mod n2+R·n2. The encryption formula provides randomness as required by security. This encryption formula can be used for enabling encrypted comparisons by edit distances. For example, the difference (diff) between encrypted characters c1 and c2 of respective plaintext values s1 and s2 is diff=gs1·rn mod n2+R1·n2−gs2·rn mod n2+R2·n2, wherein in case diff modulo n2 is zero (i.e. (R1-R2)n2 mod n2=0) this indicates that s1=s2, otherwise s1 is different from s2. Diff=(R1-R2)·n2.

While calculating the edit distance between two strings, it may be checked whether two encrypted characters of two strings are same or not. Assuming that there are two encrypted strings XYZ and YYX. As described herein, there will be two arrays having the encrypted values of the characters of the strings. To check whether Enc(X)=Enc(Y) or Enc(X)=Enc(X), the following function may be applied for each pair of ciphertexts Enc1 and Enc2:

```
function IsEqual (Enc1, Enc2){
    Calculate:
        Diff = (Enc1 − Enc2)
        Diff_under_mod = Diff mod n2
        if(Diff_under_mod == 0){
```

```
            return true
        }else{
            return false
        }
    }
}
```

There are two cases while comparing: the first case "Case 1" corresponds to two encrypted values that actually correspond to the same plaintext and the second case "Case 2" correspond to two encrypted values that correspond to the different plaintexts.

For Case1: Enc1=Enc(x) and Enc2=Enc(x). Since Enc1=gx·rn mod n2+R1·n2 and Enc2=gx·rn mod n2+R2·n2 this implies that Enc1−Enc2=(R1−R2)n2. Since (R1−R2)n2 is an integer multiple of n2, (R1−R2)n2 mod n2 will be 0. And hence, function IsEqual( ) will return true which is actually the case.

For Case2: Enc1=Enc(x) and Enc2=Enc(y). Since Enc1=gx·rn mod n2+R1·n2 and Enc2=gy·rn mod n2+R2·n2, this implies that Enc1−Enc2=(R1−R2)n2+gx·rn mod n2−gy·rn mod n2. That is (Enc1−Enc2)mod n2=0+(gx·rn mod n2−gy·rn mod n2) mod n2. For example, "gx·rn mod n2" and "gy·rn mod n2" may be referred to as A and B respectively, for simplicity. Since x and y are different, A and B would be different as well. So (A−B) will not be 0. In other terms, (A−B)mod n2 is not 0 for the following reason. Since A is gx·rn mod n2, a maximum value of A can be (n2−1) and similarly for B as well. So the maximum value (A−B) can attain is (n2−1) which under mod n2 can't be 0 unless (A-B) itself is 0 which is not possible as explained above.

In the current example of Paillier cryptosystem the value of "n" which is part of the public key only while doing edit distance calculation. Other cryptosystems like AES, block ciphers or other methods under homomorphic class of encryption may be used in accordance with the present disclosure. For example, in RSA cryptosystems, for a message m, ciphertext c is given by: c=c=me mod n where (n, e) is the public key. The same process as discussed above may be used with this encryption formula, for enabling bucketing and comparison functions and perform calculations under mod n for edit distance calculation to enable encrypted comparison.

Figure 6:
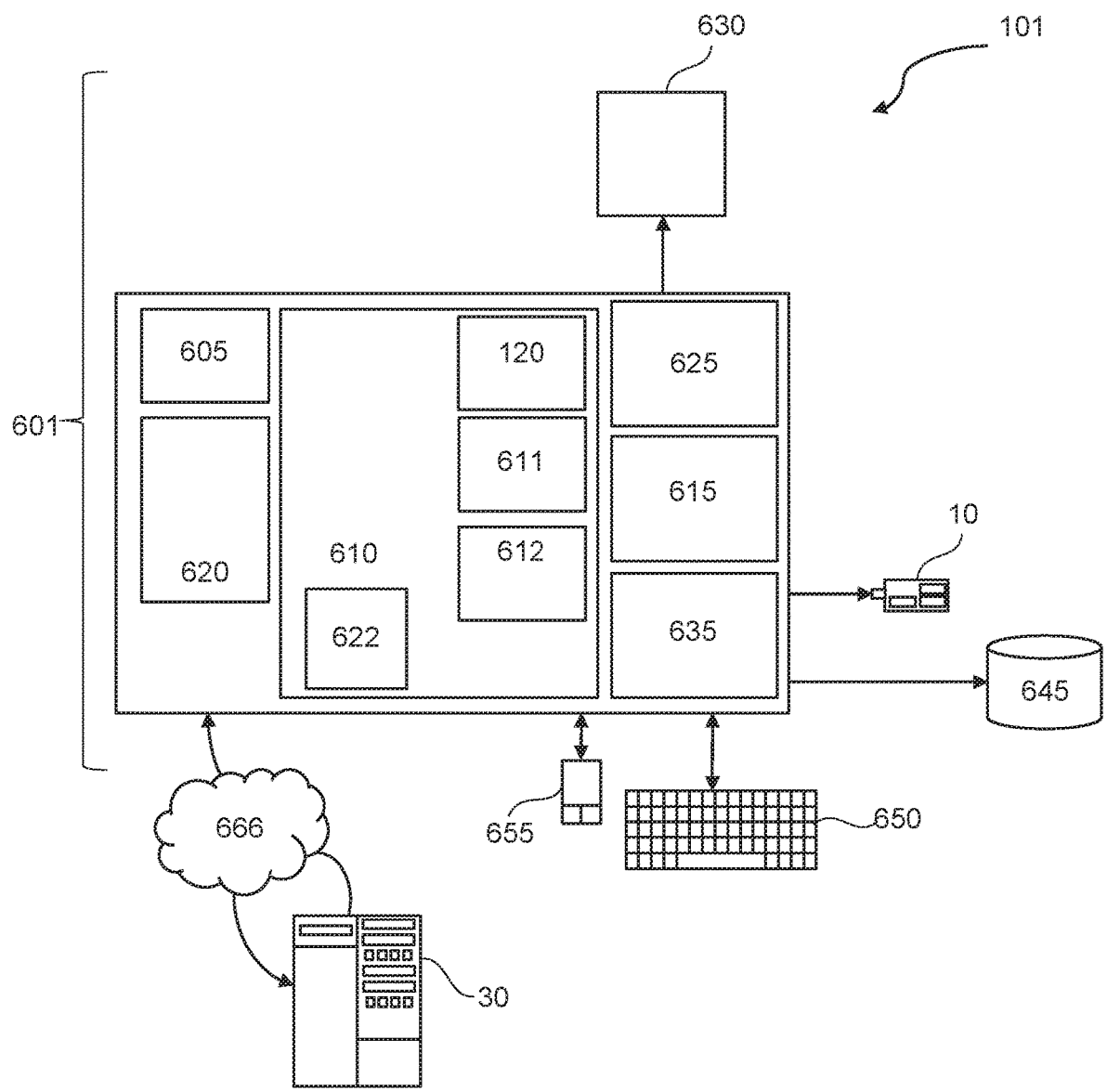
FIG. 6 represents a computerized system, suited for implementing one or more method steps as involved in the present disclosure.

FIG. 6 depicts an example hardware implementation of data integration system 101. FIG. 6 represents a general computerized system, suited for implementing method steps as involved in the present disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software, 622 (including firmware 622), hardware (processor) 605, or a combination thereof. In exemplary embodiments, the methods described herein are implemented in software, as an executable program, and is executed by a special or general-purpose digital computer, such as a personal computer, workstation, minicomputer, or mainframe computer. The most general system 101 therefore includes a general-purpose computer 601.

In exemplary embodiments, in terms of hardware architecture, as shown in FIG. 6, the computer 601 includes a processor 605, memory (main memory) 610 coupled to a memory controller 615, and one or more input and/or output (I/O) devices (or peripherals) 10 and 645 that are communicatively coupled via a local input/output controller 635. The input/output controller 635 can be, but is not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 645 may generally include any generalized cryptographic card or smart card known in the art.

The processor 605 is a hardware device for executing software, particularly that stored in memory 610. The processor 605 can be any custom made or commercially available processor, a central processing unit (CPU), an auxiliary processor among several processors associated with the computer 601, a semiconductor based microprocessor (in the form of a microchip or chip set), a macroprocessor, or generally any device for executing software instructions.

The memory 610 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 610 can have a distributed architecture, where various components are situated remote from one another, but can be accessed by the processor 605.

The software in memory 610 may include one or more separate programs, each of which comprises an ordered listing of executable instructions for implementing logical functions, notably functions involved in embodiments of this invention.

The software in memory 610 shall also typically include a suitable operating system (OS) 611. The OS 611 essentially controls the execution of other computer programs, such as the record linkage algorithm 120. The algorithm 120 may, for example, comprise a database management system or a Java application. The algorithm 120 may comprise components for performing at least part of the present method. The algorithm 120 may further comprise a component for performing standardization of data records, e.g., before performing the linkage and the matching. The standardization refers to a process of transforming data to a predefined data format. The data format may include a common data definition, format, representation and structure. The data that is to be transformed is the data that is not conform to the predefined data format. For example, the process of transforming the data may comprise processing the data to automatically transform the data where necessary to comply with those common representations that define the data format. This process of transforming data may include identifying and correcting invalid values, standardizing spelling formats and abbreviations, and validating the format and content of the data.

The methods described herein may be in the form of a source program, executable program (object code), script, or any other entity comprising a set of instructions to be performed. When a source program, then the program needs to be translated via a compiler, assembler, interpreter, or the like, which may or may not be included within the memory 610, so as to operate properly in connection with the OS 611. Furthermore, the methods can be written as an object oriented programming language, which has classes of data and methods, or a procedure programming language, which has routines, subroutines, and/or functions.

In exemplary embodiments, a conventional keyboard 650 and mouse 655 can be coupled to the input/output controller 635. Other output devices such as the I/O devices 645 may include input devices, for example but not limited to a printer, a scanner, microphone, and the like. Finally, the I/O devices 10, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 645 can be any generalized cryptographic card or smart card known in the art. The system 101 can further include a display controller 625 coupled to a display 630. In exemplary embodiments, the system 101 can further include a network interface for coupling to a network 666. The network 666 can be an IP-based network for communication between the computer 601 and any external server, client and the like via a broadband connection. The network 666 transmits and receives data between the computer 301 and external systems 30, which can be involved to perform part or all of the steps of the methods discussed herein. In exemplary embodiments, network 666 can be a managed IP network administered by a service provider. The network 666 may be implemented in a wireless fashion, e.g., using wireless protocols and technologies, such as WiFi, WiMax, etc. The network 666 can also be a packet-switched network such as a local area network, wide area network, metropolitan area network, Internet network, or other similar type of network environment. The network 666 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 601 is a PC, workstation, intelligent device or the like, the software in the memory 610 may further include a basic input output system (BIOS) 622. The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute software stored within the memory 610, to communicate data to and from the memory 610, and to generally control operations of the computer 601 pursuant to the software. The methods described herein and the OS 611, in whole or in part, but typically the latter, are read by the processor 605, possibly buffered within the processor 605, and then executed.

When the systems and methods described herein are implemented in software, as is shown in FIG. 6, the methods can be stored on any computer readable medium, such as storage 620, for use by or in connection with any computer related system or method. The storage 620 may comprise a disk storage such as HDD storage.

Figure 7:
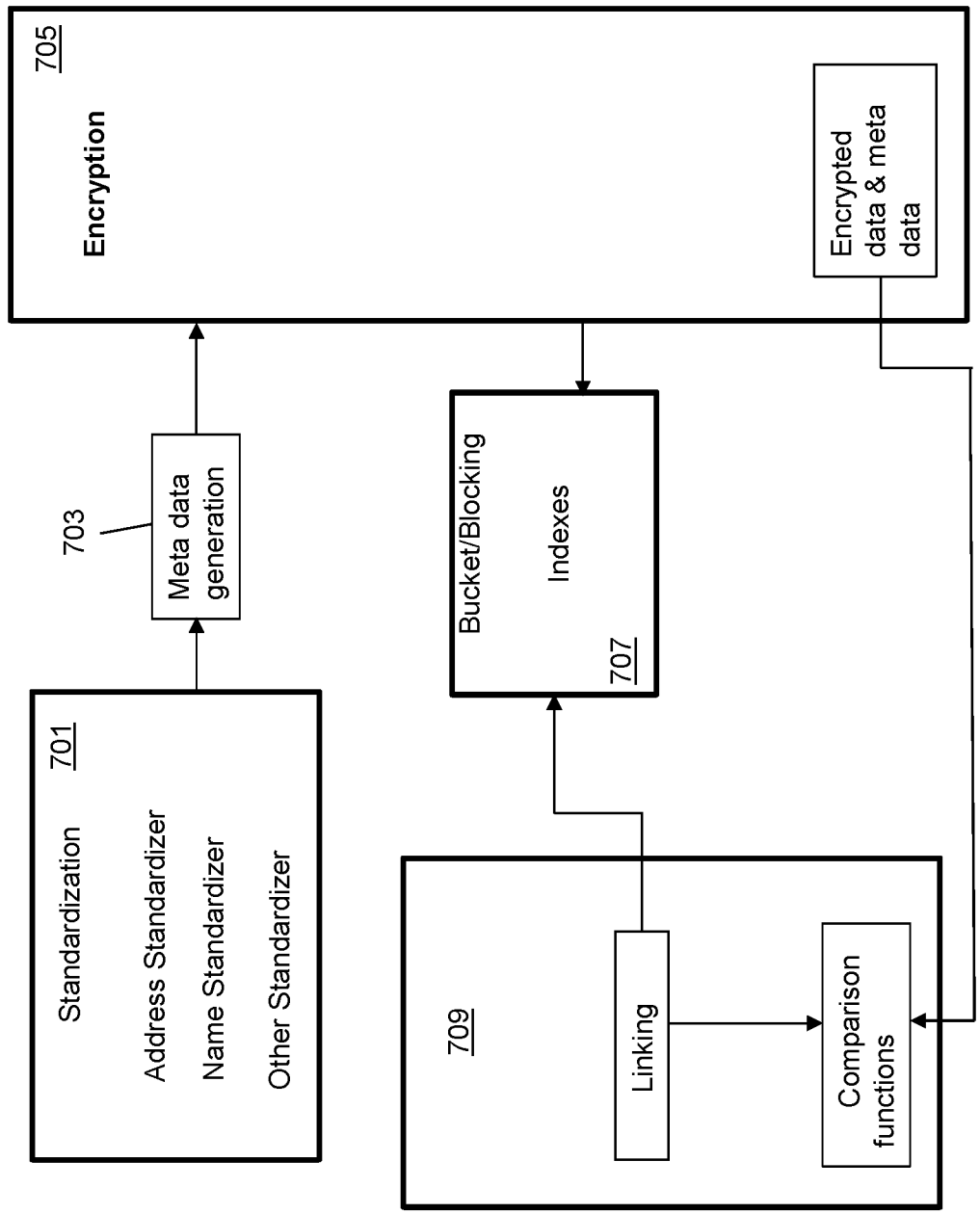
FIG. 7 is a diagram of example components of an algorithm for performing at least part of the present method.

FIG. 7 is a block diagram of example components of the algorithm 120 that implements at least part of the present method.

The algorithm 120 may comprise a pre-processing component 701, a metadata generation component 703, an encryption component 705 a grouping component 707 and a matching and linkage component 709.

A received data record may, for example, be pre-processed by the pre-processing component 701. The pre-processing may, for example, comprise standardization of the received record using, for example, address standardizer, name standardizer and/or other standardizers.

Metadata may then be generated from the pre-processed record by the metadata generation component 703. The metadata comprises one or more sets of variations of critical attributes of the pre-processed record.

The metadata as well as the attribute values of the received record may be encrypted by the encryption component 705. The encryption may be performed as described herein.

The encrypted metadata may be used by the grouping component 707 for computing hashes as described herein for buckets attributes of predefined groups of attributes. The hashes may serve as indexes for performing the linkage, for example. The hashes and the encrypted metadata may be stored in association with respective encrypted records.

The matching and linkage component 709 may be configured for a given received encrypted record to identify the existing records that may be candidate duplicate records of the given record. This may, for example, be performed by comparing the hashes of the given record with existing hashes. The candidate duplicate records may then be compared with the given record by the matching and linkage component 709 using predefined comparison functions that can compare directly encrypted data without having to decrypt the data.

Various embodiments are specified in the following clauses:

1. A method for a secure storage of data records, the method comprising: receiving a current data record having one or more attributes, each attribute having an attribute value; for each attribute of at least part of the attributes generating a predefined set of variations of the attribute value of the attribute; encrypting the received attribute values resulting in an encrypted record and encrypting the generated sets of variations; storing in a storage system the encrypted record in association with the respective encrypted sets of variations.

2. The method of clause 1, further comprising repeating the method for further received data records, wherein in each current repetition the storing of the currently encrypted record is executed depending on the respective encrypted sets of variations of the further received data record.

3. The method of clause 2, further comprising: identifying previous candidate encrypted records stored in the storage system, each identified previous candidate encrypted record having an encrypted set of variations matching the encrypted sets of variations of the currently encrypted record; comparing the current encrypted record with the previous candidate encrypted records; wherein the storing is executed depending the comparison result.

4. The method of clause 3, in case the currently encrypted record is different from the previous candidate encrypted records performing the storing of the encrypted record.

5. The method of clause 3, the storing comprising in case the current encrypted record matches at least one candidate encrypted record merging the current encrypted record and the candidate encrypted record.

6. The method of clause 1, the method further comprising defining multiple groups, associating each defined group with a respective bucket of one or more attributes resulting in multiple bucket attributes; determining bucket attributes of the multiple buckets that are part of the current record; assigning the current encrypted record to one or more of the defined groups using the encrypted sets of variations of the current encrypted record, wherein the assigning to a group of the one or more groups comprises computing a hash of at least the encrypted value of the respective bucket attributes using a hash function and storing the hash in association with the current record.

7. The method of clause 6, further comprising repeating the method for further received data records, in each repetition identifying previous candidate encrypted records having a hash which matches the computed one or more hashes of the current encrypted record; comparing the current encrypted record with the candidate encrypted records; wherein the storing is performed based on the comparison result.

8. The method of any of the preceding clauses, the one or more attributes being a set of one or more attributes, the encrypting of the attributes comprising encrypting character by character attribute values of at least a subset of attributes of the set of attributes using a first encryption method making use of a public key, wherein the difference between two ciphertexts, generated from two same values by the first encryption method, is a random term that is different from zero, wherein the application of a predefined operation on the random term results in a value indicating that the ciphertexts were generated from the same values.

9. The method of clause 8, wherein the subset of attributes are attributes that are comparable by an edit distance comparison.

10. The method of clause 8 or 9, further comprising: providing a known randomized encryption formula having a source of randomness and a public key; fixing the source of randomness resulting in a constant source; and adding a term $f(R, n)$ to the encryption formula resulting in the first encryption method, where R is a random integer number and n is a number used to generate the public key.

11. The method of claim 8, 9 or 10, wherein the first encryption method comprises creating a ciphertext c for each character s of the attribute value as follows: $c=g s \cdot r n \mod n2+R \cdot n2$, where $0<r<n$ is a constant random number, (n, g) is a public key for encryption and R is a random integer number that varies in each encryption, wherein the operation is a modulo operation indicating that the difference under modulus n2 equals to 0 for ciphertexts generated of same values.

12 The method of any of the preceding clauses, wherein the set of variations is encrypted using a second encryption method; wherein the attributes of the current encrypted record are further encrypted with a third encryption method.

13. The method of any of the preceding clauses, the set of variations of an attribute value resulting in a set of equivalents of the attribute value.

14. The method of any of the preceding clauses, the set of variations comprising any one of: spelling variations; phonetic variations; metaphonic variations and number sorting.

15. The method of any of the preceding clauses, further comprising upon receiving the current data record and before generating the variations performing a standardization of the attributes by transforming each attribute value of the attributes to a respective predefined format.

16. The method of any of the preceding clauses, further comprising upon receiving the current data record and before generating the variations compressing the attributes.

17. The method of any of the preceding clauses, the at least part of the attributes comprising all attributes of the record.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for a secure storage of data records, the method comprising:
    receiving a current data record having one or more attributes, each attribute having an attribute value;
    prior to encrypting the received attribute values, for each attribute of at least part of the one or more attributes generating a predefined set of variations of the attribute value of the attribute, each variation of the attribute value comprising a varied value of the attribute;
    encrypting the received attribute values resulting in an encrypted record and encrypting the generated sets of variations; and
    storing in a storage system the encrypted record in association with the respective encrypted sets of variations.

2. The method of claim 1, wherein a subsequent repetition of the storing of the currently encrypted record is executed depending on the respective encrypted sets of variations of the further received data record.

3. The method of claim 2, further comprising:
    identifying previous candidate encrypted records stored in the storage system, each identified previous candidate encrypted record having an encrypted set of variations matching the encrypted sets of variations of the currently encrypted record; and
    comparing the current encrypted record with the previous candidate encrypted records, wherein the storing is executed depending the comparison result.

4. The method of claim 3, further comprising:
    responsive to the currently encrypted record being different from the previous candidate encrypted records, storing the encrypted record.

5. The method of claim 3, further comprising:
    responsive to the currently encrypted record matching at least one candidate encrypted record, merging the currently encrypted record and the candidate encrypted record.

6. The method of claim 1, the method further comprising:
    defining multiple groups;
    associating each defined group with a respective bucket of a plurality of attributes, resulting in multiple bucket attributes;
    determining bucket attributes of the multiple bucket attributes that are part of the current record; and
    assigning the current encrypted record to one or more of the defined groups using the encrypted sets of variations of the current encrypted record, wherein the assigning to a group of the one or more groups comprises:
        computing a hash of at least the encrypted value of the respective bucket attributes using a hash function; and
        storing the hash in association with the current record.

7. The method of claim 6, further comprising:
    identifying, in a subsequent iteration, previous candidate encrypted records having a hash which matches the computed one or more hashes of the current encrypted record; and
    comparing the current encrypted record with the candidate encrypted records, wherein the storing is performed based on the comparison result.

8. The method of claim 1, wherein:
    the one or more attributes are a set of one or more attributes;
    the encrypting of the attributes comprises encrypting character by character attribute values of at least a subset of attributes of the set of attributes using a first encryption making use of a public key;

the difference between two ciphertexts, generated from two same values by the first encryption method, is a random term that is different from zero; and the application of a predefined operation on the random term results in a value indicating that the ciphertexts were generated from the same values.

9. The method of claim 8, wherein the subset of attributes are attributes that are comparable by an edit distance comparison.

10. The method of claim 8, further comprising:

providing a known randomized encryption formula having a source of randomness and a public key;

fixing the source of randomness resulting in a constant source; and adding a term f(R, n) to the encryption formula resulting in the first encryption method, wherein R is a random integer number and n is a number used to generate the public key.

11. The method of claim 8, wherein:

the first encryption method comprises creating a ciphertext c for each character s of the attribute value as follows: $c = g^s \cdot r^n \mod n^2 + R \cdot n^2$, where $0 < r < n$ is a constant random number, (n, g) is a public key for encryption and R is a random integer number that varies in each encryption; and the operation is a modulo operation indicating that the difference under modulus $n^2$ equals to 0 for ciphertexts generated of same values.

12. The method of claim 8, wherein:

the set of variations is encrypted using a second encryption method; and the attributes of the current encrypted record are further encrypted with a third encryption method.

13. The method of claim 1, wherein the set of variations of an attribute value result in a set of equivalents of the attribute value.

14. The method of claim 1, wherein the set of variations are selected from the group consisting of: spelling variations, phonetic variations, and metaphonic variations.

15. The method of claim 1, further comprising, upon receiving the current data record and before generating the variations, performing a standardization of the attributes by transforming each attribute value of the attributes to a respective predefined format.

16. The method of claim 1, further comprising, upon receiving the current data record and before generating the variations, compressing the attributes.

17. The method of claim 1, the at least part of the one or more attributes comprising all attributes of the record.

18. A computer program product for a secure storage of data records, the computer program product comprising:

one or more computer readable storage media and program instructions stored on the one or more computer readable storage media, the program instructions comprising:

program instructions to receive a current data record having one or more attributes, each attribute having an attribute value;

program instructions to, prior to encrypting the received attribute values, for each attribute of at least part of the one or more attributes, generate a predefined set of variations of the attribute value of the attribute, each variation of the attribute value comprising a varied value of the attribute;

program instructions to encrypt the received attribute values resulting in an encrypted record and encrypting the generated sets of variations; and program instructions to store in a storage system the encrypted record in association with the respective encrypted sets of variations.

19. A computer system for a secure storage of data records, the computer system comprising:

one or more computer processors, one or more readable storage media, and program instructions stored on the one or more computer readable storage media for execution by at least one of the one or more computer processors, the program instructions comprising:

program instructions to receive a current data record having one or more attributes, each attribute having an attribute value;

program instructions to, prior to encrypting the received attribute values, for each attribute of at least part of the one or more attributes, generate a predefined set of variations of the attribute value of the attribute, each variation of the attribute value comprising a varied value of the attribute;

program instructions to encrypt the received attribute values resulting in an encrypted record and encrypting the generated sets of variations; and program instructions to store in a storage system the encrypted record in association with the respective encrypted sets of variations.

* * * * *